C. BILLUPS.
Improvement in Plows.

No. 123,858.

Patented Feb. 20, 1872.

Witnesses:
Geo. C. Lemon
Thos. L. W. Durand

Inventor:
Cealy Billups
per ——
Attorneys.

123,858

UNITED STATES PATENT OFFICE.

CEALY BILLUPS, OF NORFOLK, VIRGINIA.

IMPROVEMENT IN PLOWS.

Specification forming part of Letters Patent No. 123,858, dated February 20, 1872.

Specification describing certain Improvements in Double-Mold Plows, invented by CEALY BILLUPS, of Norfolk, in the county of Norfolk, and State of Virginia.

The invention will first be fully described and then clearly pointed out.

Figure 1:
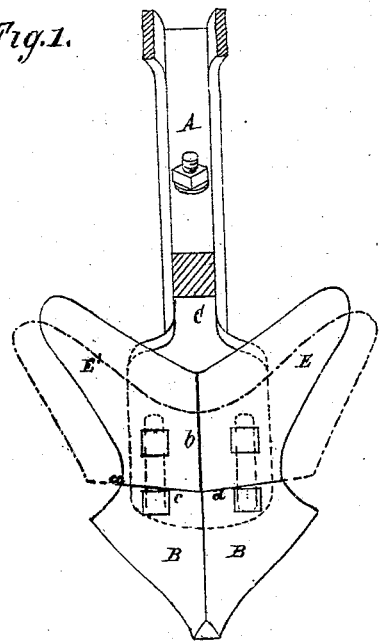
Figure 3:
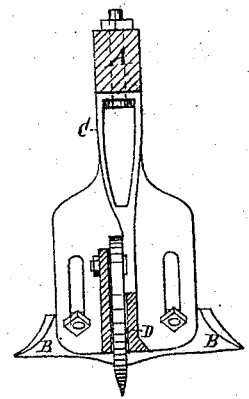
Figure 2:
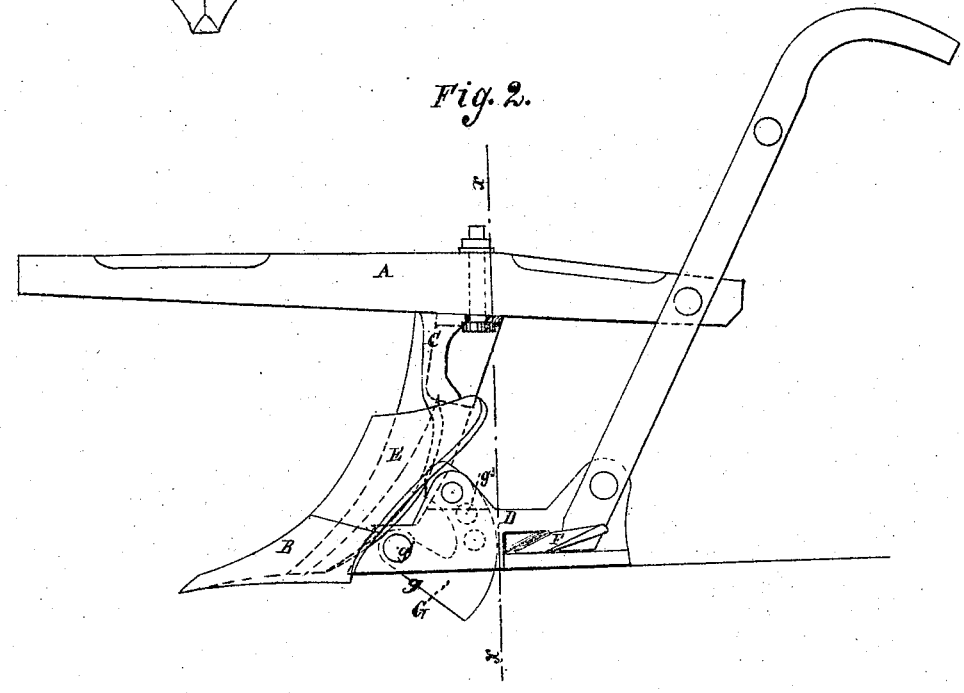

Figure 1 of drawing is a front view of the double-mold plow upon which my improvements are based. Fig. 2 is a side view of the same. Fig. 3 is a vertical section of same taken in line $x\ x$ of Fig. 2.

A represents the bearing of plow; B, the double mold; C, the standard; D, the shoe; E E', wing-mold boards; and F, auxiliary wings. The wing mold-boards E of other double shovels are, however, removable and replaceable by others at different stages of the growth of the plant. Hence, when the plants are young, they use the smaller and more contracted wings, which will not be likely to throw the soil too far or to cover up the bud of the plant; but when the plant has sufficiently stalked, and it is desired to throw the earth all around the stem, in order to smother weeds that are springing up in close proximity thereto, and which would, to a great extent, rob it of its proper sustenance, they remove the smaller mold-boards and substitute larger ones. Thus, they are compelled to keep two pairs of mold-boards for each plow. This is expensive, and those which are off the plow are always liable to be lost or get out of place on a farm. I have improved upon these mold-board wings by constructing them in two parts, the lines $a\ b$ of each wing coinciding and jointing closely with the lines $c$ or $d$ of the share B. In the first plowing of the young plants I place them as shown in full lines in Fig. 1 of drawing, but subsequently remove their fastening-bolts and turn the edge $b$ of wing E' on edge $d$ of share B. The other is correspondingly located, when they are fastened and made to extend further and have a wider throw on each side, but they are not so high. This renders but one set of wings necessary, is cheaper, and each plow always has its own set attached to it.

In Fig. 2 of drawing, G is a guide-coulter, having cutter $g$ and pivoted at $g^1$, within a cavity of the shoe D. It is adjustable therein by means of the apertures $g^3$ in rear of cutter and $d$ is the top of the shoe. The cutter is intended to penetrate into the bottom of furrow, serve as a guide to the plow, and compel it to move steadily and without wabbling.

In Fig. 3 of drawing, the plow-standard C is shown, with a cavity, C', in the upper and rear part thereof. The headed screw-bolt H is placed within cavity and passed up through the standard and beam, being then drawn up to any required tightness by means of nut and washer $h\ h'$.

It will thus be observed that there is no opportunity for grass, roots, or trash to get between the bolt-head and beam, and require to be cleaned out by the plowman, while, also, the said bolt is prevented from the friction of these things, which have a tendency to make it work loose; but, in avoiding these difficulties of a bolt-head beneath, I also remove the necessity of causing the standard to pass through the beam and form a tenon, which is a weak joint in a plow, unless the tenon is made so large as greatly to weaken the beam. My bolt requires but a small hole through the beam, which does not sensibly diminish its strength.

Having thus described all that is necessary to a full understanding of my invention, what I esteem to be new, and desire to secure by Letters Patent, is—

1. The two wing mold-boards, E E, constructed so as to form two different sizes according as they are arranged, as shown in Fig. 1 of drawing, or reversed in the manner described.

2. The pivoted guide-coulter G, having cutter-edge $g$ and made vertically adjustable, in rear of the share and mold-boards, by means of a pin and apertures, $g^3$, as and for the purpose set forth.

C. BILLUPS.

Witnesses:
   THOS. D. D. OURAND,
   CHAS. A. PETTIT.